United States Patent
Memmesheimer

[19]

[11] Patent Number: 5,913,544
[45] Date of Patent: Jun. 22, 1999

[54] HINGE SYSTEM FOR A BRACKET SYSTEM

[75] Inventor: Günther Memmesheimer, Dinslaken, Germany

[73] Assignee: Rolec Enclosures USA Inc., Vero Beach, Fla.

[21] Appl. No.: 08/889,143

[22] Filed: Jul. 7, 1997

[30] Foreign Application Priority Data

Dec. 19, 1996 [DE] Germany ............................ 196 53 016

[51] Int. Cl.$^6$ ................................................. F16L 11/118
[52] U.S. Cl. .................................... 285/153.1; 285/272.1; 285/284.1; 285/907; 174/86
[58] Field of Search .............................. 285/153.1, 272.1, 285/907, 126.1, 284.1, 283; 174/21 JC, 73.1, 86

[56] References Cited

U.S. PATENT DOCUMENTS

| | | | |
|---|---|---|---|
| 1,648,624 | 11/1927 | Schultz | 285/272.1 X |
| 1,724,815 | 8/1929 | Adams | 174/86 |
| 2,447,026 | 8/1948 | O'Brien et al. | 174/86 X |
| 2,825,586 | 3/1958 | Robboy | 174/86 X |
| 3,091,484 | 5/1963 | Laupot | 285/907 X |
| 3,409,315 | 11/1968 | Wichers et al. | 285/907 X |

*Primary Examiner*—Dave W. Arola
*Attorney, Agent, or Firm*—Dennis L. Cook

[57] ABSTRACT

New articulated hinge elements are provided for bracket systems with a double-T shaped carrying profile designed for containing electrical cables supplying control equipment that permit the articulated connection between parts or elements of such bracket system for horizontal slewing or swivelling movements with a cable passage which is open to the outside and which can be closed. Such hinge elements enable flexible connection of horizontal bracket parts with open and lockable cable guides for the continuous insertion of cables.

7 Claims, 2 Drawing Sheets

HINGE SYSTEM FOR A BRACKET SYSTEM

BACKGROUND OF THE INVENTION

1. Field of the Invention

This invention relates to hinge elements for brackets of cable carrying systems having a double-T shaped profile. More particularly, it concerns hinge elements for support brackets of such systems that enable horizontal slewing or swiveling movements between system parts.

2. Description of the Prior Art

German Patent Application No. 196 30 807.0-34 discloses bracket systems for electrical cable carrying control equipment including support sections in the shape of a double-T integrally comprising a central vertical bridge, an upper horizontal bridge and a lower horizontal bridge. Vertical thin walls extend integrally and partially upwardly from the lower horizontal bridge and are spaced apart from the central vertical bridge thereby forming empty spaces that act as channels for receiving of cables, access openings that exist above said vertical thin walls, and there are cappings engagable with the vertical thin walls to close the access openings. Longitudinal bores in the double-T structure receive fasteners to fix together a multiplicity of the system units.

The new hinge elements of the present invention enable hinged connections between various elements of such bracket systems to enable horizontal slewing or swivelling movements to occur between the elements of the bracket systems.

Hinges for horizontal slewing and swivelling movements for brackets with cable passages which are open and lockable for inserting cables with mounted serial plugs, are known. For example, German patents G 9212763.0 and G 93101023 show hinges of this type. The carrying hinge parts are formed from two fork parts pushed above each other. They are connected flexibly to each other, and their connecting bridge of the two fork surfaces are designed as muffs for receiving tubes or as connecting flange for wall mounting. The open cable passage, particularly between the fork parts of the hinge, is covered by a bellow.

German patent DE 4111 74 A1 discloses a hinge where the transition from the laterally open hinge to the connecting muff which is open at the top for a tube with open top or slot for feeding the cables. A slot is guided around the muff from the side to the top in that way that it connects the hinge gap with the longitudinal slot in the connecting muff and the tube, so that the cables can be inserted continuously from the outside. Obviously, this binge is to be covered, e.g., closed by a bellow which is not mentioned.

Furthermore, a type of hinges with horizontal bracket continuation is known where the two bracket parts which are flexibly connected by the hinge, are offset vertically, i.e. in height. This results from the hinge mainly consisting of two bushings that fit into each other which are borne vertically pivoting in each other, and which have a horizontally projecting connecting piece at each of their vertically opposing ends, through which the connection to parts of the bracket or the wall is made. The diameter of the articulated sleeves is big enough for feeding through cables with mounted plugs. Also know are hinges of this type where parts of the pivot bearing consist of ring-shaped elements with front silding connections so that an axial-radial bearing is created.

OBJECTS

A principal object of the invention is the provision of new hinge elements for bracket systems having double-T shaped cable carrying profiles to provide hinged connections between system elements permitting horizontal slewing or swivelling movements.

A further object is the provision of such hinge elements that enables a contour-identical outside shape in the entire bracket and bracket transmission without offset so that with all possible component combinations as in-line and continuous outside shape of the bracket is provided.

Another object is the provision of unique hinge elements for the double-T shaped cable carrying profiles wherein all elements of the bracket systemcan be connected without additional connecting means allowing cables to be inserted continuously through the connections from the outside without having to thread the mounted serial plugs through bearing openings or like openings.

SUMMARY OF THE INVENTION

The objects are accomplished in accordance with the invention by the provision of unique articulated hinge elements for a system with a double-T shaped carrying profile according to Ger. Pat. Appln. 196 30 807.0-34 for the articulated connection between parts or elements of such bracket system for horizontal slewing or swivelling movements with a cable passage which is open to the outside and which can be closed.

Hinge elements of the invention provide the double-T shaped bracket systems flexible connection of horizontal bracket parts with open and lockable cable guides for the continuous insertion of cables and are characterized by a variety of features.

The carrying parts of the hinge are designed in the shape of a fork and are positioned above each other with the open sides and are connected there by cog-eye elements. Two U-shaped covers are arranged between the hinge forks, which close the cable passage on three sides, namely at the side in the running direction and at the top.

The U-shaped covers each cover half the height between the hinge forks and are arranged vertically offset between the hinge fork elements.

Each of the two U-shaped covers is connected with one of the fork hinge parts by means of a draw-pull and lock.

At the opposite horizontal surfaces of the partial cable channel covers and the inner side of the fork and the corresponding horizontal longitudinal surfaces of the U-shaped covers, at the end of the sides, draw-pulls are attached which work together.

The top-side bridge of the U-shape of the cover is designed as a cylinder segment which is concentric to the hinge axle. Equally, a vertical connection, which is pointed towards the inside of the hinge, between the cable channel covers on both sides, is concentrically cylinder-shaped. Their radiuses are measured in such a way that as outer and inner cylinder segment they can be turned past one another with the smallest distance without making contact.

The head covers which are designed as cylindrical segments have moulded horizontal cover surfaces shaped like ring elements on the sides facing each other. These are just wide enough to cover the surface of the opening which develops when the angle of the hinge is turned at the top of the cover.

Concentric to the hinge axle, there is a passage for changing the cables from one cover level to the next. The cross section of this passage is independent of the position of the hinges.

The connecting bridges of the hinge forks, which are turned away from each other, are designed as connecting flange for the face connection with a carrying profile, particularly with the carrying profile of Ger. Pat. Appln. 196 30 807.0-24, and the other horizontal carrying elements of the bracket system and are provided with bore holes for the front assembly with screws and with bore holes for bolts as assembly aid and receiving the shear forces.

Bolts project from the flanges so far that they provide a push-on guide before the screws grip.

The connecting bridges for the hinge forks, which are designed as flanges, are generally shaped like a double-T so that cable passages remain on both sides.

The cable passages on the flange sides have moulded covers up to the top connecting bridge of the opposite U-shaped cover and up to half the height. The detachable U-shaped covers are positioned between these and the horizontal fork surfaces.

The covers can be pushed in when the hinge forks are positioned at 90° so they are blocked by the opposite connecting piece between the moulded cable covers in any other angle position.

When the covers are pushed on, e.g., after the cables have been inserted, the cables position between the sides of the U-shaped covers and change in the middle section from one cover level to another.

The outside shape of the bracket stretches continuously over the hinge element as the outside shape of the cover and the carrying part are of the same shape as the rest of the bracket, so that the contour of the bracket is continued in the hinge element.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

DESCRIPTION OF THE PREFERRED EMBODIMENTS

Figure 1:
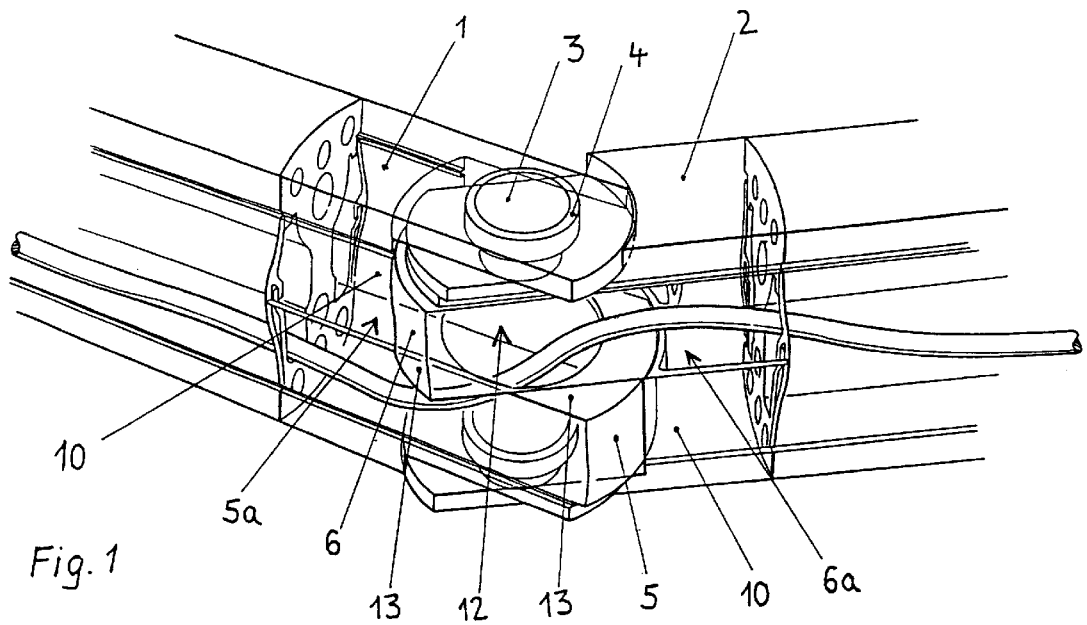
FIG. 1 is a fragmentary, isometric view of a hinge element of the invention with covers in place, i.e. closed, showing the flow of electrial cables changing inside of the hinge from one cover level to the next through an articulated concentric opening. (The illustration is without connecting flange which is shown in FIG. 3).
Figure 2:
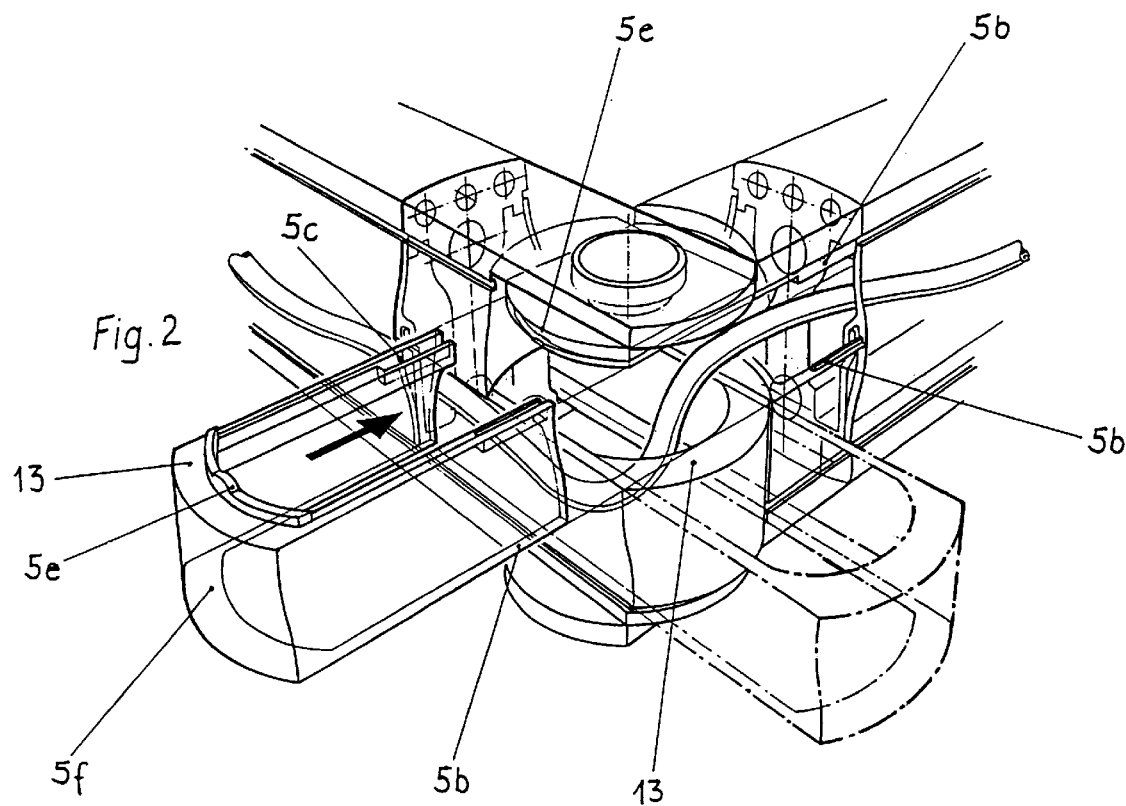
FIG. 2 is a fragmentary, isometric view showing how, after the cables are inserted, the room for guiding the cables is closed by the pushed-in U-shaped covers. The bottom cover is in pushed-in condition and virtually prior to pushing in, the top cover is shown prior to pushing in. (The illustration is without connecting flange which is shown in FIG. 3).

Referring in detail to the drawings, they show a hinge element of the invention for a bracket system with double T-shaped carrying profile according to patent application 196 30 807.0-34, for the hinged connection between any elements of such bracket system for horizontal slewing or swivelling movements.

The hinge consists of two carrying fork-shaped parts 1,2 which are connected to a hinge by cog-eye-combination 3,4 and two U-shaped cover parts 5,6 which close the open space between the fork joint to the outside. The U-shaped covers 5,6 each cover half the height between the hinge forks and are arranged vertically offset between the hinge fork elements.

Each of the U-shaped covers 5,6 is connected with one of the fork hinge parts by means of the draw-pull 5b,5c and lock 5e. At the opposite horizontal longitudinal surfaces of the U-shaped covers, at the end of the sides, the draw-pulls 5b,5c work together.

Figure 3:
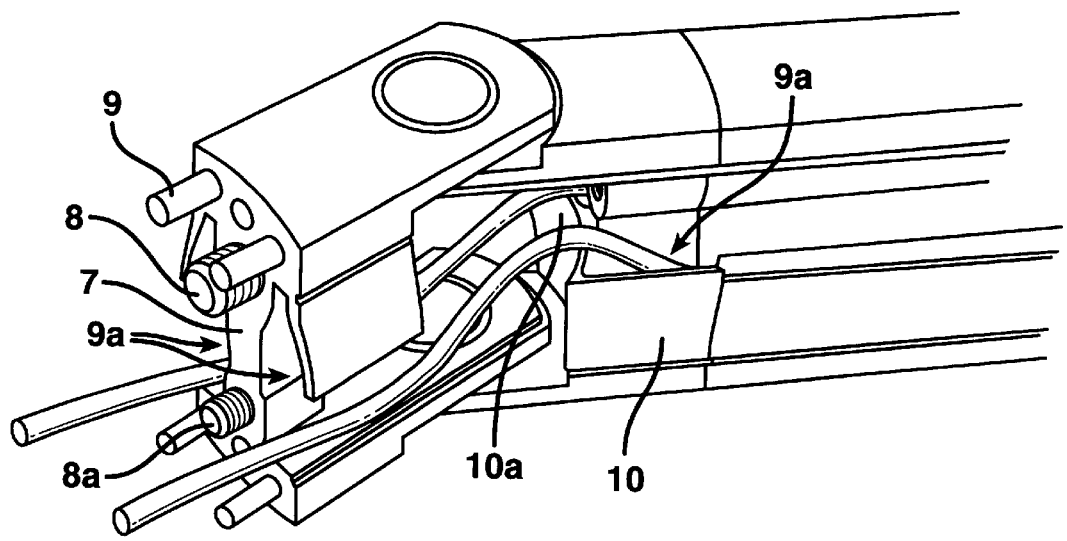
FIG. 3 is a fragmentary, isometric view showing the back of the hinge fork with projecting connecting bolts and the bolts as shearing and guide bolts. The back of the hinge fork is designed as screw-down flange for the face mounting to the other components of the bracket system. (The illustration is without the U-shaped cover elements).

The top-side bridge of the U-shape 5f of the cover is designed as a cylinder segment which is concentric to the hinge axle. Equally, the vertical connection 10a (FIG. 3) which is pointed towards the inside of the hinge, between the cable channel covers on both sides is concentrically cylinder shaped. Their radiuses are measured in such a way that as outer and inner cylinder segment they can be turned past one another with the smallest distance without making contact.

The backs of the forks are designed as flanges 7 for front installation to all elements of the bracket system by means of simple screw-pin 8,9 connections, e.g., screws 8, 8a and pins 9. The pins 9 project from the flanges 7 so far that they provide push-on guides before the screws grip.

The connecting bridges for the hinge forks designed as flanges 7 are generally shaped like a double-T so the cable passages (channels) 9a exist on both sides.

Cables and strands of cables can be inserted from both sides from the outside and for this purpose the front flanges 7 are designed in double-T shape, by which a cable channel passage is created which is open on both sides.

The cable passage as well as the cable channels on both sides of the flange part are covered by U-shaped covers 5,6. They are held between a fork plate and the partial cover of the cable channel 10 which is moulded onto the opposite fork plate of the same fork piece.

The covers are pushed on after the cables have been inserted, and by this the laterally open cable guide spaces are closed to the outside. Between the covers, a vertical passage 12 which is concentric to the articulated axle remains open during all positions of the hinge angle. The cables are passed through this opening from one cover level to the next.

The invention provides a horizontal bracket joint with open cable guide (which can be covered) for the continuous insertion of cables with mounted serial plugs, without need for relatively voluminous bellows as cover aids, but also without horizontal element displacement of the bracket parts which are connected by the hinge. Also, with the guarantee that all elements of the bracket system can be connected without additional connecting means, with the possibility to insert cables continuously, i.e. through the connections from the outside and without having to thread the plugs through bearing openings and other openings of such kind.

Furthermore, the articulated element forms a unit which is equal in contour with the bracket system (regarding the outside design), so that the outside profile of the bracket continues in the hinge element without interruption.

The invention makes possible that the carrying part of the hinge element 1,2 and the cable cover part 5,6 are separated from each other, whereby the cable cover part is horizontally divided into two parts 5,6 and the parts are positioned above each other between the carrying hinge parts. Both cover parts are flexible against each other, but are each connected stationarily with one of the carrying hinge parts 1,2. Both cover halves 5,6 are separated horizontally and are designed in a U-shape and are open at the inside 5a,6a at the sides facing each other, whilst the other sides are closed at the outside by the hinge forks. This creates a cable channel which is closed to the outside, but can be opened or closed, as needed.

The cover parts are loosely connected with the hinge forks. They are pushed between the carrying parts and the cover pans 10,10 which are connected to these in one piece. For the cover principle, it is important that when the hinge turns the cables are guided shearing-free from the cover surface of the hinge fork to the cover surface of the next one. This assumes a sufficiently sized opening section for the cable change from one cover surface to the next, which remains constant opposite to all changes of the hinge angle.

Because of the U-shaped construction and the arrangement of the cover elements 5,6 of this invention, a circular cross section 12, with a diameter corresponding to the inside width between the U-sides of the covers, remains free between the covers, coaxial to the hinge axle, for all hinge angles. The part projecting above this circular surface up to the top end of the U-cover is provided with a ring segment type horizontal surface 13, which closes this part, which swings out of the closed hinge area when the hinge turns.

The carrying parts of the hinge 1,2 are designed as fork elements with a flat fork cross section which are positioned above each other in the known way so that the fork opening sides are joint flexibly through bolt-eye, resp., cog-eye combinations. To obtain plane profile surfaces at the top and the bottom, the outside parts of the forks are ledgy.

The backs of the forks are designed as screw-down flanges 7 for face mounting of the other parts of the bracket system. All elements have the same corresponding drill patterns and connection surfaces, hence any connection combination is possible. The attachment is made by two screws, i.e, one main screw 8 in the top tension cord part and an auxiliary screw 8a in the bottom part. In case of torsional strain, the shear forces are partly absorbed by the bolts. Furthermore, the bolts are installation aids. They project so far that they guide the connecting part before the screws grip. The connecting flanges 7 are designed in the shape of a double-T, by which passages stay clear on both sides as cable channels which connect to the double-T shaped carrying profile and angle profile and to the double-T shaped flanges of other connecting elements.

In the assembly process, after the bracket and the device case have been completely assembled, the cables are inserted into the open cable channels on both sides. Only when the cables have been inserted completely into the bracket, after connection and check-up, the cappings are finally pushed in. For this purpose the hinge of the hinge element is set at an angle of 90° and the two U-shaped cappings are pushed in crosswise. The cables proceed between the side bridges of the cappings and are placed between the cappings in the above described free passage 12. At the end of the slide path the cappings engage in the catch 5e.

Figure 4:
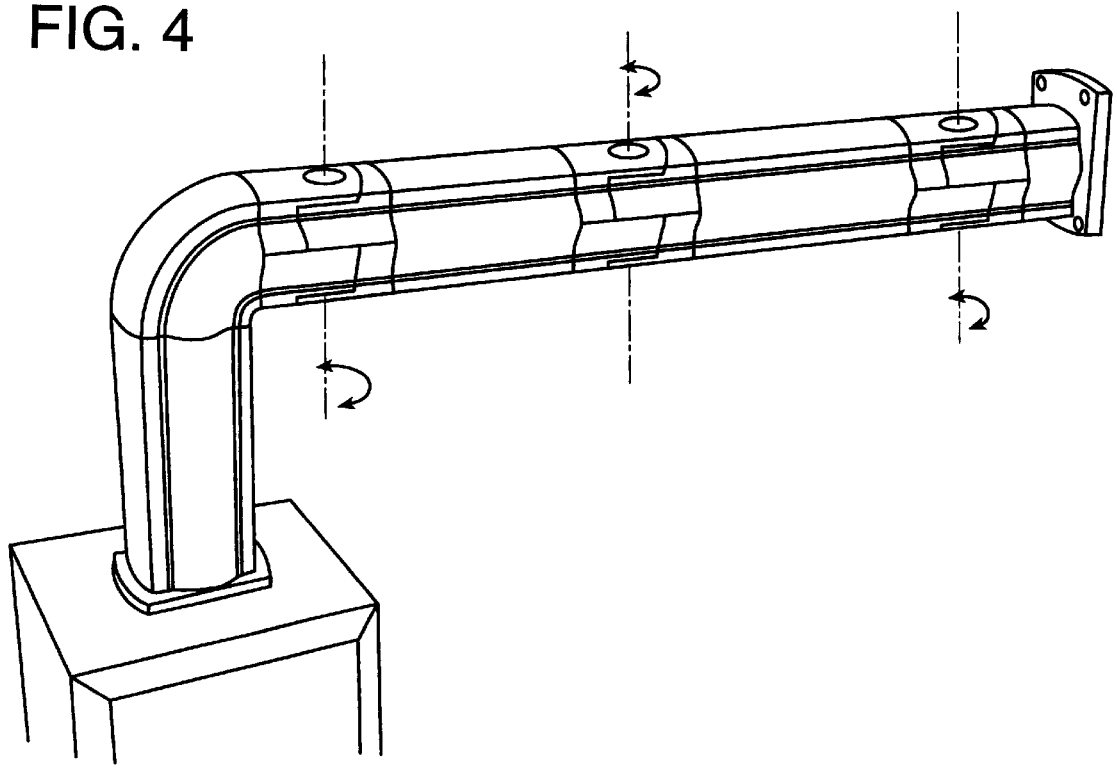
FIG. 4 is a fragmentary, isometric view showing the hinge elements of the invention in possible combinations with other components and shows at the same time how the hinge element is included without transition in the enclosed outside profile of the bracket.

The construction form of the hinge element according to this invention enables a contour-identical outside shape to the entire bracket and a bracket transmission without offset so that with all possible component combinations (FIG. 4), an in-line and continuous outside shape of the bracket is created.

I claim:

1. Hinge element for a bracket system for flexible connection of horizontal bracket parts with open and lockable cable guides for the continuous insertion of cables into cable passages comprising:

two main hinge sections, said main hinge sections having a base flange, said base flange of said main hinge sections having a flat back face to make a flush contact with end flanges of said bracket system being connected by said hinge element, said base flange back face having aligning and connecting means including screws, bolts, and bore holes, said aligning and connecting means placed semetrically with the aligning and connecting means situated on said end flanges of said bracket system to properly align and connect said hinge element to said bracket system, said aligning and connecting means being of suitable size and material such that said aligning and connecting means distribute the shear forces exerted on the aligning and connecting means, by the weight of said hinge element and said bracket system, back upon said hinge element and said bracket system, said base flanges having two horizontally aligned flat arms attached perpendicular to and extending from the top and bottom of said base flange on the side opposite said flat back face, said arms positioned such that they interleave within each other when the extended ends of said arms on one main hinge section are connected by a pivotal connecting means to the extended ends of said arms of the second main hinge section, said pivotal connecting means allowing said connected main hinge sections to rotate approximately 270 degrees around said pivotal connecting means thereby creating a hinge axis located at said pivotal connecting means and parallel to the said base flange, two U-shaped covers, said U-shaped covers having vertical sides with a width of approximately one half the distance between said arms, said vertical sides having sufficient length to fully enclose said hinge element when inserted between said arms, said vertical sides having a clamping means for holding said U-shaped covers in place against said main hinge sections when said U-shaped covers are fully inserted between said arms, said U-shaped covers having one closed end, said closed end having a cylindrical shape with the radius of the cylinder being the distance from said closed end to said connecting means when said u-shaped covers are inserted into said hinge element, said closed end width being the width of the surface opening which develops when said main hinge sections are turned at a 90 degree angle from each other, said U-shaped covers having top and bottom sides, said top and bottom sides extending from said closed end partially down the U ending in a curved edge concentric to said hinge axis such that the curved edges create a cable passage inside the hinge element for changing cables from one U-shaped cover to the other regardless of the positions of said main hinge sections, said U-shaped covers, when fully inserted between said arms, being vertically aligned one above the other such as to enclose said cable passages, vertical connection panels extending down from the top arm of one said main hinge section and up from the bottom arm of the other said main hinge section, said vertical connection panels having the width of said base flange said vertical connection panels having a cylinder shape such that the cylinder shape has a larger radius than that of said curved ends of the U-shaped covers, said vertical connection panels being placed on said arms at a distance from said base flange such as to allow said U-shaped covers to rotate within said vertical connection panels when said main hinge sections are rotated.

2. The hinge element of claim 1 wherein:

said bolts of said connecting means extend out further from said end flanges than said screws, said bolts providing a push-on alignment guide prior to said screws engaging into said end flanges of said bracket system.

3. The hinge element of claim 2 wherein:

said end flanges of said main hinge sections are shaped like a double T such that said cable passages occur on both sides of said end flanges.

4. The hinge element of claim 3 further comprising:

side covers, said side covers extending from said base flange of each said main hinge section, said side cover adjacent to and abutting the top arm of one base hinge section and the bottom arm of the other base hinge section, said side covers extending part way down said arms and extending one half the distance between said arms such that when said U-shaped covers are in place, and said hinge element is not rotated, said vertical connection panels and said U-shaped covers abut such that they enclose said cable passages.

5. The hinge element of claim 4 wherein:

said U-shaped covers can be inserted into said hinge element only when said main hinge sections are positioned at 90 degrees relative to each other and are not insertable when said main hinge elements are at any other angle because said insertion is blocked by said side covers.

6. The hinge element of claim 5 wherein:

said U-shaped covers are inserted after cables have been inserted into said cable passage, said cables positioned inside said U-shaped covers through said cable passage created by said top and bottom sides of said U-shaped covers such that said cables transition from one U-shaped cover to the other U-shaped cover.

7. The hinge element of claim 6 wherein:

the outside shape of said bracket system and the outside shape of said hinge element when connected to said bracket system with said U-shaped covers inserted are the same such that the outside shape and contour of said bracket system is continued on said hinge element.

* * * * *